(12) United States Patent
Jokinen et al.

(10) Patent No.: US 10,445,267 B2
(45) Date of Patent: Oct. 15, 2019

(54) DIRECT MEMORY ACCESS (DMA) UNIT WITH ADDRESS ALIGNMENT

(71) Applicant: FREESCALE SEMICONDUCTOR, INC., Austin, TX (US)

(72) Inventors: Tommi Jorma Mikael Jokinen, Austin, TX (US); Gus Ikonomopoulos, Austin, TX (US); Jatin Vinay Pai, Austin, TX (US)

(73) Assignee: NXP USA, INC., Austin, TX (US)

( * ) Notice: Subject to any disclaimer, the term of this patent is extended or adjusted under 35 U.S.C. 154(b) by 228 days.

(21) Appl. No.: 15/197,229

(22) Filed: Jun. 29, 2016

(65) Prior Publication Data

US 2018/0004692 A1 Jan. 4, 2018

(51) Int. Cl.
*G06F 13/28* (2006.01)
*G06F 13/16* (2006.01)
*G06F 13/40* (2006.01)

(52) U.S. Cl.
CPC .......... *G06F 13/28* (2013.01); *G06F 13/1673* (2013.01); *G06F 13/4022* (2013.01)

(58) Field of Classification Search
CPC ... G06F 13/28; G06F 13/1673; G06F 13/4022
See application file for complete search history.

(56) References Cited

U.S. PATENT DOCUMENTS

| | | | |
|---|---|---|---|
| 5,388,237 A | 2/1995 | Sodos | |
| 5,594,927 A | 1/1997 | Lee et al. | |
| 5,870,627 A | 2/1999 | O'Toole et al. | |
| 6,330,623 B1 | 12/2001 | Wu et al. | |
| 6,865,638 B1 * | 3/2005 | Chatterjee | G06F 13/28 710/22 |
| 7,373,437 B2 * | 5/2008 | Seigneret | G06F 13/28 709/212 |
| 8,447,897 B2 | 5/2013 | Xu et al. | |
| 8,918,552 B2 | 12/2014 | Bellows et al. | |
| 9,128,925 B2 | 9/2015 | Jokinen et al. | |
| 2014/0351825 A1 | 11/2014 | Xu et al. | |
| 2016/0179612 A1 | 6/2016 | Jokinen et al. | |

FOREIGN PATENT DOCUMENTS

| | | | | |
|---|---|---|---|---|
| EP | 1564643 A2 * | 8/2005 | ......... | G06F 17/5045 |
| EP | 1564643 A2 | 8/2005 | | |

* cited by examiner

*Primary Examiner* — Henry Tsai
*Assistant Examiner* — John B Roche (57) ABSTRACT

Systems and methods for operating a DMA unit with address alignment are disclosed. These may include configuring a bandwidth control setting for a read job that includes a data transfer size corresponding to a first number of bytes. A second number of bytes to reach a read address alignment is determined. In a first data transfer, a third number of bytes substantially equal to the first number of bytes plus the second number of bytes are transferred. In subsequent data transfers of the read job, the first number of bytes are transferred to the data buffer. After the third number of bytes are transferred to the data buffer, a fourth number of bytes from the data buffer are transferred to a destination.

20 Claims, 4 Drawing Sheets

FIG. 4

DIRECT MEMORY ACCESS (DMA) UNIT WITH ADDRESS ALIGNMENT

BACKGROUND

Field

This disclosure relates generally to data processing systems, and more specifically, to a data processing system having a direct memory access (DMA) unit.

Related Art

As time advances, integrated circuits continue to increase in complexity. System-on-Chip (SoC) and other multiple-core integrated circuits are being developed in order to support various applications such as multimedia applications, communications, networking, real time applications and the like, for example. Modern integrated circuits are generally capable of executing a large number of tasks substantially in parallel. A multiple channel Direct Memory Access (DMA) controller, for example, can manage multiple data transfers while reducing the load from integrated circuit cores (processors). In some cases, the DMA controller may process multiple transfers at approximately the same time. However, more system resources, such as memory and computing resources, than available in a particular architecture may be needed to meet system latency requirements.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Generally, there is provided, a system and method for operating a DMA unit with address alignment. Because bandwidth may be shared amongst multiple DMA jobs concurrently, a bandwidth control setting (BWC) is used to define a number of bytes to transfer before context switching to another job. When a misaligned source address is detected, a read data engine of the DMA transfers a number of bytes to reach alignment plus a BWC number of bytes in the first transfer. In subsequent transfers, the read data engine transfers aligned BWC number of bytes until all bytes of the job are read into a buffer. After a suitable number of bytes of data are read into the buffer, a write engine transfers the data to a destination location through automatically aligned writes. A status is provided from the read data engine to the buffer and from the buffer to the write data engine, allowing for a processing priority based on the status of each job.

By aligning the first read transfer of data to the buffer, subsequent read transfers of BWC size within a job remain aligned. Write transfers to a destination may use an interconnect transaction size rather than the BWC size while maintaining alignment within the job.

Figure 1:
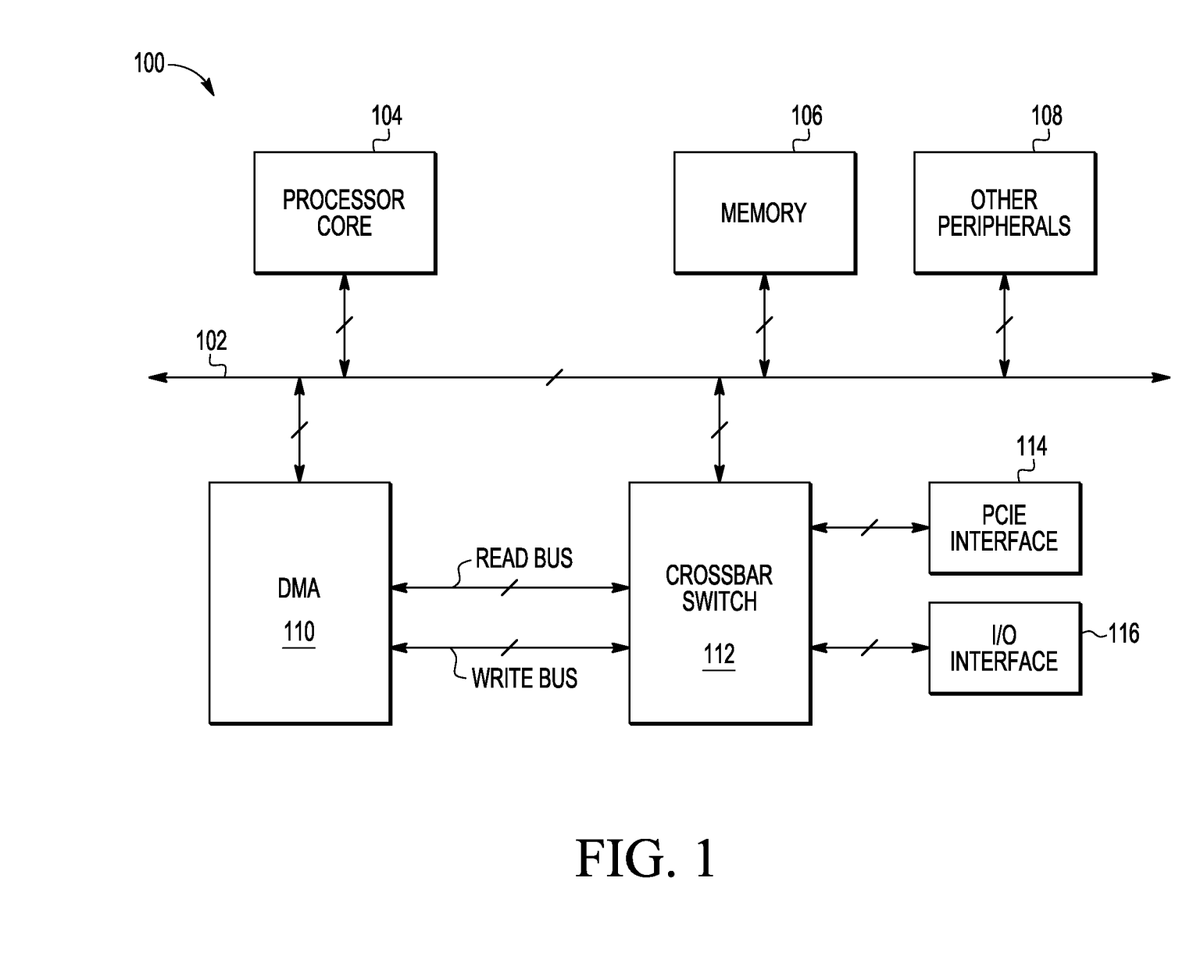
FIG. 1 illustrates, in block diagram form, a data processing system according to an embodiment of the present disclosure.

FIG. 1 illustrates a data processing system 100 in accordance with an embodiment of the present invention. In some embodiments, data processing system 100 may be characterized as a system-on-a-chip (SoC). System 100 includes system bus 102, processor core 104, memory 106, other peripherals 108, direct memory access (DMA) unit 110, crossbar switch 112, a peripheral component interconnect express (PCIE) interface 114, and an input/output (I/O) interface 116. Processor 104, memory 106, other peripherals 108, DMA unit 110, and crossbar switch 112 are each bidirectionally coupled to system bus 102 by way of respective communication buses. The PCIE interface 114 and I/O interface 116 are each bidirectionally coupled to the crossbar switch 112. DMA unit 110 is bidirectionally coupled to crossbar switch 112.

Processor 104 may be any type of processor, including circuits for processing, computing, etc., such as a microprocessor (MPU), microcontroller (MCU), digital signal processor (DSP), or other type of processing core. Processing system 100 may include multiple processors like processor 104. Processor 104 is configured to execute sets of instructions in order to carry out designated tasks. In the course of executing instructions, processor 104 can generate transfer requests to transfer data from a source to a destination. Each transfer of data may be referred to as a job.

Memory 106 may include any type of volatile or non-volatile memory array cells, such as dynamic random access memory (DRAM), static random access memory (SRAM), flash, etc. Memory 106 can be a transfer source or a transfer destination for a job. For example, memory 106 may be a volatile memory, such as a random access memory (RAM), which stores and provides data in response to transfer requests. Accordingly, data can be stored in memory 106 based on a data transfer in which memory 106 is the transfer destination, and data can be retrieved from memory 106 based on a data transfer in which memory 106 is the transfer source. Processing system 100 may include multiple memories like memory 106 or a combination of different memories. For example, processing system 100 may include a flash memory in addition to memory 106. The flash memory can store and provide data in response to transfer requests as well. In similar fashion to memory 106, data can be stored or retrieved from flash memory based on transfers having the flash memory as the destination or the source, respectively.

Other examples of transfer sources and destinations in processing system 100 include PCIE interface 114 and I/O interface 116. PCIE interface 114 provides a physical and logical layer interface to one or more peripheral devices (not shown). Data can be provided to or retrieved from the peripheral devices via PCIE interface 114 based on transfers that respectively identify PCIE interface 114 as the destination or the source. I/O interface 116 provides a physical and logical layer interface to one or more input and output devices (not shown). In similar fashion to PCIE interface 114, data is retrieved and provided to the input and output devices based on data transfers that respectively identify I/O interface 116 as the destination or the source of the transfer.

System bus 102 can be any type of bus for communicating any type of information such as data, address, instructions, and control. System bus 102 may also be referred to as a main coherency bus. System bus 102 and crossbar switch 112 provide the communication backbone for data transfers, as well as communication of other information. In particular, system bus 102 provides a communication backbone for communications among the processor 104, memory 106, other peripherals 108, DMA unit 110, and crossbar switch 112. Crossbar switch 112 is a switch fabric that can route communications among DMA unit 110, PCIE interface 116, I/O interface 117, and system bus 102.

Other peripherals 108 of processing system 100 may include any number of other circuits and functional hardware blocks such as accelerators, timers, counters, communications, interfaces, analog-to-digital converters, digital-to-analog converters, PLLs, and the like for example. Other peripherals 108 are each bidirectionally coupled to system bus 102 by way of respective communication buses. In some embodiments, one or more other peripherals 108 may be bidirectionally coupled to the crossbar switch 112 by way of respective communication buses.

DMA unit 110 is a circuit module that can generate a data transfer from a source to a destination. DMA unit 110 is coupled to crossbar switch 112 to transfer data via a read bus and a write bus. For example, DMA unit 110 can transfer I/O interface (116) data via crossbar switch 112 without affecting system bus 102.

Figure 2:
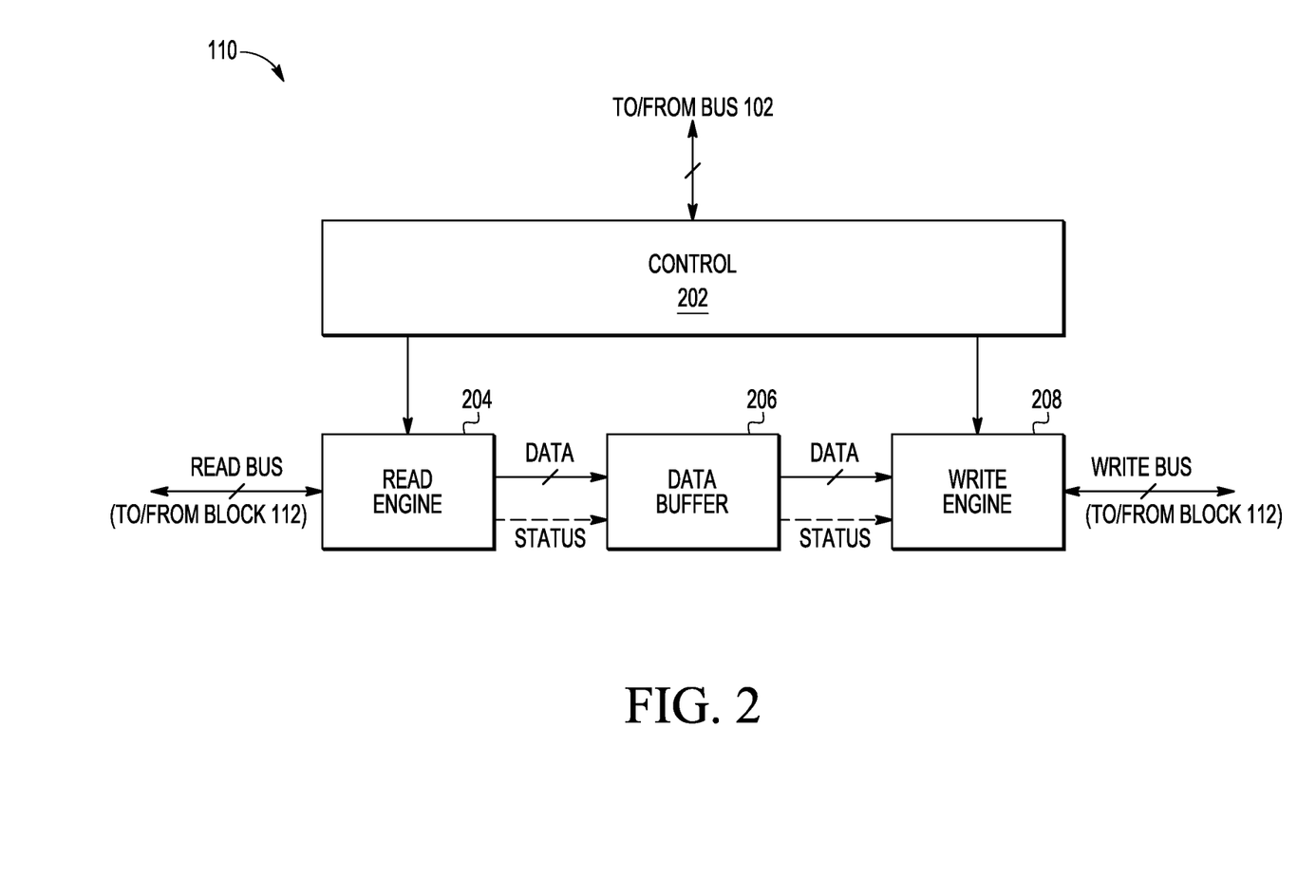
FIG. 2 illustrates, in block diagram form, a DMA unit of FIG. 1 according to an embodiment of the present disclosure.

FIG. 2 illustrates, in a simplified block diagram form, an exemplary DMA unit 110 of FIG. 1 according to an embodiment of the present disclosure. DMA unit 110 includes a control unit 202, a read data engine 204, a write data engine 208, and a data buffer 206. DMA control unit 202 is coupled to read data engine 204 and write data engine 208. Read data engine 204 is coupled to receive read data from crossbar switch 112 and provide read data addresses to crossbar switch 112. Read data engine 204 is coupled to provide read data and status to data buffer 206 and data buffer 206 is coupled to provide write data and status to write data engine 208. Write data engine 208 is coupled to provide write data to crossbar switch 112 and provide write data addresses to crossbar switch 112. DMA unit 110 communicates with system bus 102 by way of a communication bus coupled between the control unit 202 and the system bus 102. DMA unit 110 communicates with crossbar switch 112 to transfer data by way of a read bus and a write bus coupled between the DMA unit 110 and the crossbar switch 112.

Control unit 202 includes circuitry which interfaces with system bus 102 including data, address, and controls signals and corresponding bus protocol. Control unit 202 is coupled to provide control information to read data engine 204 and write data engine 208. Control unit 202 provides job descriptors and assigns appropriate tasks of a transfer job to read data engine 204 and write data engine 208, for example.

In operation, DMA unit 110 transfers data from a source location to a destination location. Note that, in the illustrated embodiment, a single read data engine and write data engine is indicated. However, in alternative embodiments, any number of read data and write data engines may be present and would be controlled by the DMA control unit 202. Data transfer tasks of the DMA are generally referred to as jobs. For example, a read job may include transferring data from a source location to a data buffer, and a write job may include transferring data from the data buffer a destination location.

Read data engine 204 controls obtaining data from source locations corresponding to a read data transfer job. Read data engine 204 provides a read data address to crossbar switch 112 which routes the read data address to an appropriate peripheral (e.g. memory 106, PCIE interface 114, I/O interface 116, or other peripherals 108). In response, the addressed peripheral provides read data by way of crossbar switch 112 back to DMA unit 110. The read data is returned to read data engine 204 which stores the read data to data buffer 206. Read data engine 204 generates the read addressees which indicates the location of the source data, as well as any corresponding attributes. Read data engine 204 provides status of read jobs to data buffer 206.

Write data engine 208 controls providing data stored in the data buffer 206 to destination locations corresponding to a write data transfer job. Write data engine 208 provides a write data address and write data to crossbar switch 112 which routes the write data address and write data to the appropriate peripheral (e.g. memory 106, PCIE interface 114, I/O interface 116, or other peripherals 108). The write data is therefore stored into the write data address location. Note that write data engine 208 obtains the write data from data buffer 206. Write data engine 208 generates the write addressees which indicates the location of the destination, as well as any corresponding attributes. Write data engine 208 receives status of read jobs from data buffer 206.

Figure 3:
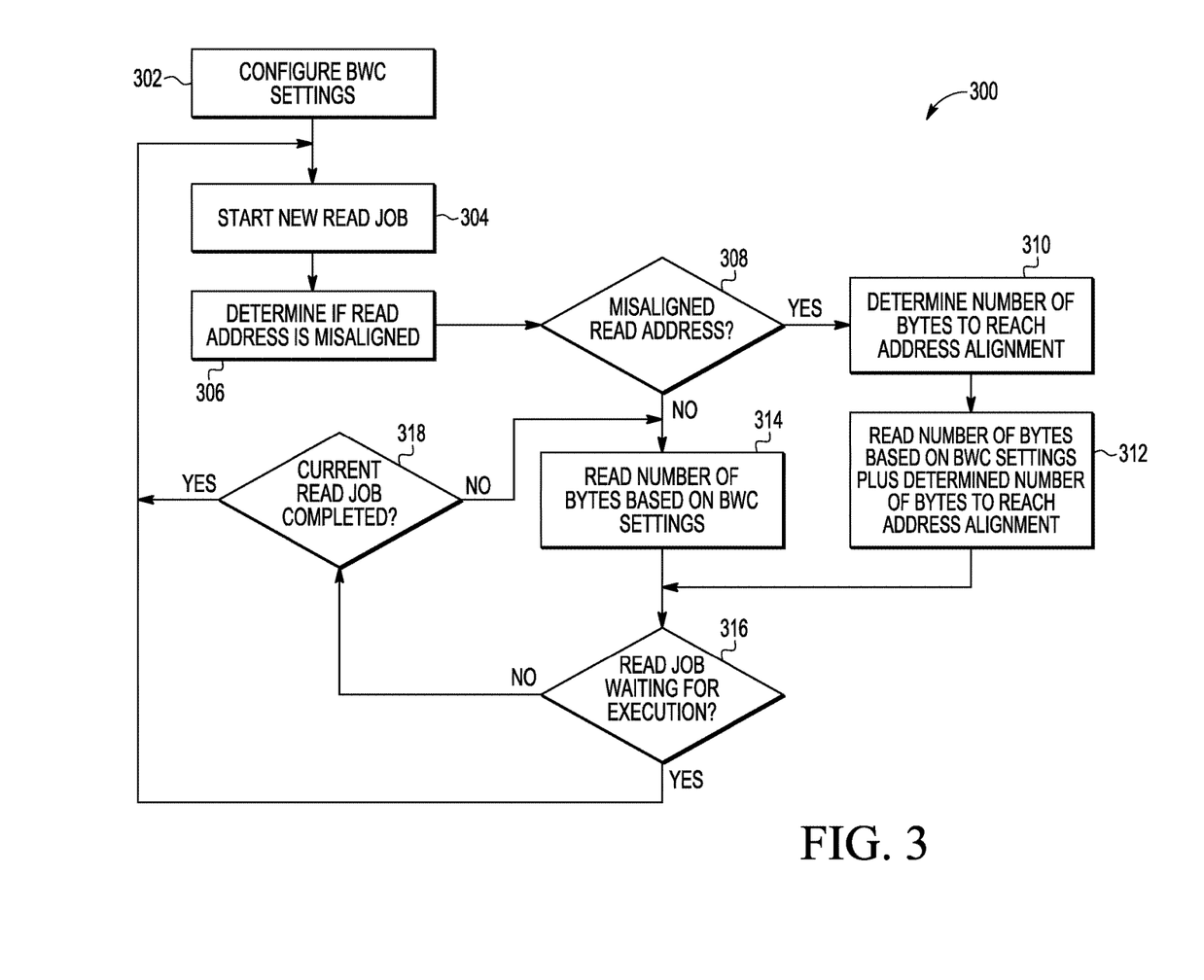
FIG. 3 illustrates, in flow chart diagram form, a simplified DMA read engine flow in accordance with an embodiment of the present disclosure.

FIG. 3 illustrates, in flow chart diagram form, a simplified DMA read data engine flow 300 in accordance with an embodiment of the present disclosure. Read data engine 204 controls obtaining data from source locations corresponding to a read job. When processing multiple read jobs, bandwidth sharing may be employed. Read data engine 204 provides status of read jobs to data buffer 206.

At step 302, configure bandwidth control (BWC) settings. Bandwidth sharing includes processing N bytes out of M bytes, where M is a total number of bytes in a read job and N is a predetermined number of bytes to transfer before context switching to a different transfer task, for example. In this scenario, the context switching is performed repeatedly until all transfer jobs are complete. The BWC settings include information such as transfer size, priority, and the like. The transfer size in number of bytes, of a transfer before context switching, for example may be 1 K-byte size transfers. Therefore, it may be desirable for DMA unit 110 to adhere to the BWC settings to satisfy system bandwidth and latency requirements. For example, reads from non-cacheable space such as I/O may be important to align to the data bus width to avoid additional misaligned transfers.

At step 304, a new read job is started. Read data engine 204 starts a new read job. The read job includes the read data engine 204 transferring data from a source location address to the data buffer 206.

At step 306, determine if read address is misaligned. At the start of a read job, the read data engine 204 makes a determination of whether the source location address is aligned or misaligned. At step 308, if the source location address is determined misaligned (YES), then determine the number of bytes required to reach address alignment at step 310. Alignment of a misaligned address may be considered as an address adjustment that improves the performance for subsequent transfers. Alignment may normally correspond with the width of an interconnect bus, such as a 32-byte wide data bus interconnect for example. If the source location address is determined to be aligned (NO), then the read data engine flow continues at step 314.

At step 312, after the number of bytes to reach alignment are determined at step 310, read a number of bytes based on the BWC setting plus the determined number of bytes to reach alignment. To read the number of bytes, read data engine 204 transfers a first number of bytes from the source location address to the data buffer 206. The first number of bytes transferred is substantially equal to the transfer size corresponding to the BWC setting plus the determined number of bytes to reach alignment. For example, if the BWC setting includes a transfer size of 1 K-bytes and the determined number of bytes to reach alignment is 56 bytes, then the first number of bytes transferred is approximately equal to 1 K plus 56 bytes or 1080 bytes. After the first number of bytes are transferred, the read data engine flow continues at step 316.

At step 314, read a number of bytes based on the BWC setting. To read the number of bytes, read data engine 204 transfers a number of bytes equal to the transfer size corresponding to the BWC setting, from the source location to the data buffer 206. For example, if the BWC setting includes a 1 K-byte transfer size, then 1 K bytes are transferred from the source location to the data buffer 206. After the number of bytes are transferred, the read engine flow continues at step 316.

At step 316, determine whether a read job is waiting for execution. If another read job is waiting for execution (YES), then a new read job is started at step 304. For example, a second read job may be waiting for execution, such that when the second read job is started, it can share bandwidth with a current read job by using context switching. If another read job is not waiting for execution (NO), then the read data engine flow continues for a current read job at step 318.

At step 318, determine whether the current read job is complete. If all bytes of the current read job have completed transfer from the source location to the data buffer 206 (YES), then start a new read job at step 304. If all bytes of the current read job have not completed transfer (NO), then the read data engine flow continues at step 318.

Figure 4:
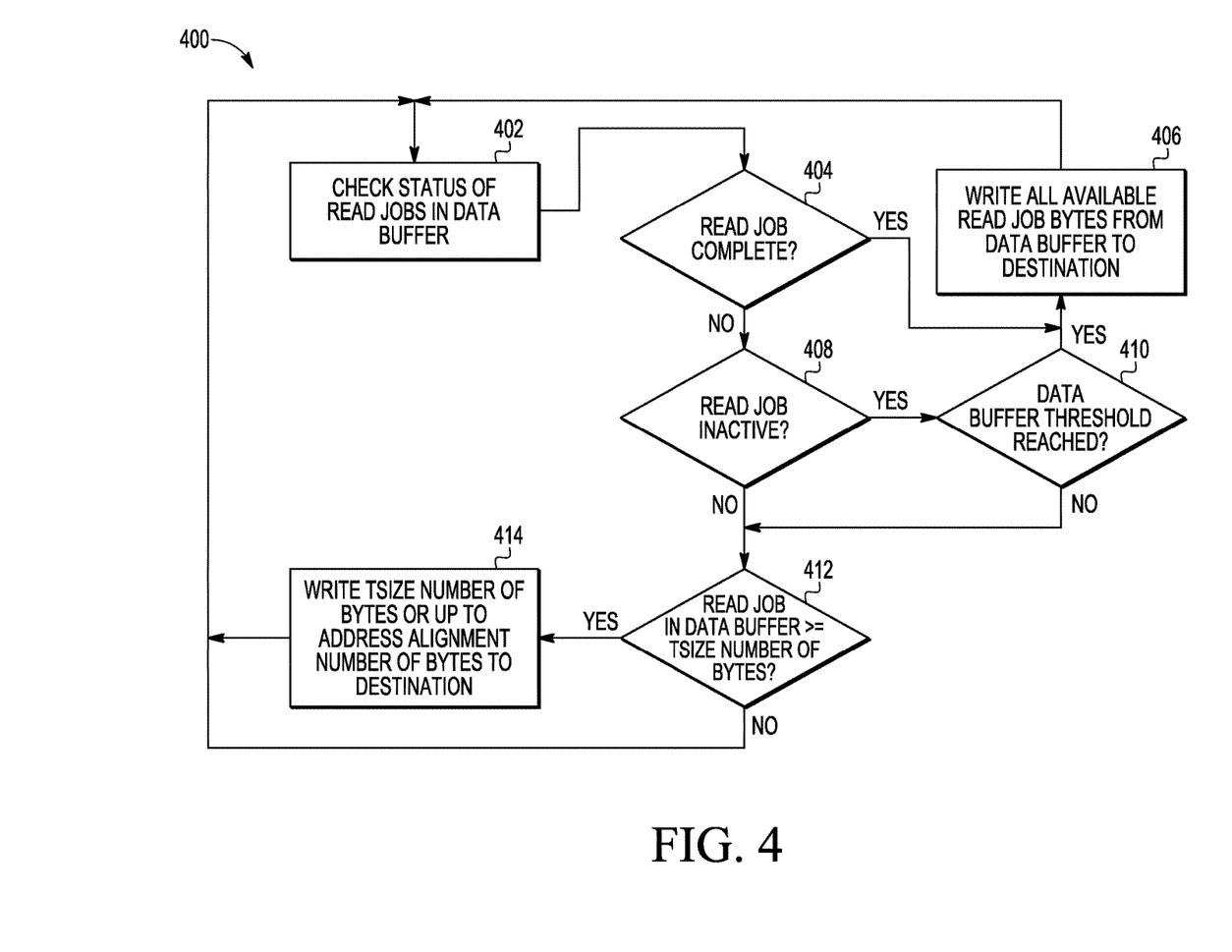
FIG. 4 illustrates, in flow chart diagram form, a simplified DMA write engine flow in accordance with an embodiment of the present disclosure.

FIG. 4 illustrates, in flow chart diagram form, a simplified DMA write data engine flow 400 in accordance with an embodiment of the present disclosure. Write data engine 208 controls transferring data from data buffer 206 to destination locations, based on read jobs. When processing multiple write jobs, bandwidth sharing may be employed using context switching. Because the read data engine 204 transfers data based on a transfer size included in the BWC settings, the write data engine 208 does not need do the same. For example, the write data engine 208 can instead transfer data based on an interconnect transaction size (TSIZE) while bandwidth sharing is maintained. TSIZE is generally the common or negotiated transfer size in bytes within a data processing system, such as an SoC, that is supported by the peripherals in the processing system. The TSIZE number of bytes may be based on a minimum buffer size of each destination peripheral, crossbar switch, and the like.

At step 402, check status of read jobs in data buffer 206. Data buffer 206 includes a status for each read job. The write data engine 208 receives status information for each read job. The status of a read job provided by the data buffer 206 may include information such as whether a read job is complete, active, out of storage space, and the like, for example. A read job may be considered complete when all read transfers are done and the transferred data is available to the write data engine. A read job may be considered "active" as long as there are outstanding read requests and may be considered "inactive" as long as there are no outstanding read requests. A read job may be considered "out of storage" if the size of the transfer is larger than the amount of storage space available in the data buffer 206. The status of a read job may be used to determine the priority of processing the read job. For example, when processing read jobs, a read job having a status indicative that a read job is completed may receive the highest priority, while a read job having a status indicative that the read job is inactive and a data buffer threshold had been reached may have a lower priority.

At step 404, determine whether a read job is complete. Write data engine 208 determines whether the read job is completed based on corresponding status information. If all bytes of the read job have completed transfer from the source location to the data buffer 206 (YES), then write all corresponding data bytes from data buffer 206 to a destination at step 406. If all bytes of the current read job have not completed transfer (NO), then the write data engine flow continues at step 408.

At step 406, write all data bytes corresponding to the read job. The data bytes are transferred from the data buffer 206 to the destination location. After all of the bytes are written from the data buffer 206 to the destination, the write data engine flow continues at step 402.

At step 408, determine whether a read job is inactive. Write data engine 208 determines whether the read job is active or inactive based on corresponding status information. If the read job is inactive (YES), then the write data engine flow continues at step 410. If the read job is active (NO), then the write data engine flow continues at step 412.

At step 410, determine whether a data buffer threshold has been reached. The data buffer threshold may be a threshold relative to the amount of used space within the data buffer 206. The data buffer threshold may be set to indicate when the data buffer 206 is above a predetermined amount of utilization. For example, a data buffer threshold may be set at 80% utilization for a 2 K-byte data buffer indicating that when the threshold is reached, only 20% or less of the 2 K-byte data buffer space is available for read jobs. If the data buffer threshold has been reached (YES), then the write data engine flow continues at step 406 where all of the bytes of the inactive read job are written from the data buffer 206 to the destination. If the data buffer threshold has not been reached (NO), then the write data engine flow continues at step 412.

At step 412, determine whether the read job in the data buffer 206 is greater than or equal to a TSIZE number of bytes. TSIZE is generally the common or negotiated transfer size in bytes within a data processing system 100, such as a SoC, that is supported by the peripherals in the data processing system 100. TSIZE may also be referred to as interconnect transaction size of the data processing system 100. For example, a common transfer size supported by the peripherals within a SoC may be 256 bytes. The TSIZE number of bytes may be based on a common buffer size of data transfer destinations. The TSIZE number of bytes may be reached when sufficient read data has been transferred or stored into the data buffer 206. If the read job in the data buffer includes a TSIZE number of bytes or more (YES), then the write data engine flow continues at step 414. If the read job in the data buffer has less than a TSIZE number of bytes (NO), then the write data engine flow continues at step 402.

At step 414, write TSIZE number of bytes to destination or up to address alignment number of bytes to destination. After determining that at least a TSIZE number of bytes or address alignment number of bytes are available in the data buffer 206, the write data engine transfers or respectively writes a TSIZE number of bytes or address alignment number of bytes to the destination. After writing the required number of bytes, the write data engine flow continues as step 402.

Generally, there is provided, a method of operating a direct memory access (DMA) system including configuring a bandwidth control setting for a first read job, the bandwidth control setting including a data transfer size corresponding to a first number of bytes; determining a second number of bytes, the second number of bytes to reach a read address alignment; in a first data transfer of the first read job, transferring a third number of bytes to a data buffer, the third number of bytes substantially equal to the first number of bytes plus the second number of bytes; in subsequent data transfers of the first read job, transferring the first number of bytes to the data buffer; and after the third number of bytes are transferred to the data buffer, transferring a fourth number of bytes from the data buffer to a destination. The fourth number of bytes may further include an interconnect transaction size number of bytes. Determining a second number of bytes may further include determining a second number of bytes by using a read data engine. The method may further include providing a status of the first read job to a write data engine. The method may further include using the write data engine, transferring bytes to the destination based on the status of the first read job. Providing a status may further include providing a status indicative that the first read job is inactive and the data buffer has reached a threshold. Providing a status may further include providing a status indicative that the first read job is complete. Transferring a fourth number of bytes may include transferring all bytes from the data buffer to the destination based on the indication that the first read job is complete. Transferring the first number of bytes to the data buffer may further include context switching from the first read job to a second read job after the first number of bytes are transferred to the data buffer.

In another embodiment, there is provided, a method of operating a direct memory access (DMA) system including configuring a bandwidth control setting for a first read job, the bandwidth control setting including a data transfer size corresponding to a first number of bytes; determining, by a read data engine, a second number of bytes, the second number of bytes to reach a read address alignment for the first read job; using the read data engine to transfer a third number of bytes to a data buffer, the third number of bytes substantially equal to the first number of bytes plus the second number of bytes; after transferring the third number of bytes, using the read data engine to transfer the first number of bytes to the data buffer; iteratively repeating the step of using the read data engine to transfer the first number of bytes to the data buffer until all bytes of the read job are transferred to the data buffer; and using a write data engine to transfer a fourth number of bytes from the data buffer to a destination. The method may further include providing a status of the first read job to the write data engine. The method may further include transferring bytes to the destination based on the status of the first read job. Providing a status of the first read job may further include providing a status indicative that the first read job is inactive and the data buffer has reached a threshold. Providing a status may further include providing a status indicative that the first read job is complete. Transferring a fourth number of bytes may include transferring all bytes from the data buffer to the destination based on the indication that the first read job is complete.

In yet another embodiment, there is provided, a direct memory access (DMA) system including a control circuit including a bandwidth control configuration for a first read job, the bandwidth control configuration having a data transfer size corresponding to a first number of bytes; a read data engine coupled to the control circuit and to a data buffer, the read data engine operable to: determine a second number of bytes, the second number of bytes to reach a read address alignment for the first read job; transfer a third number of bytes to a data buffer, the third number of bytes substantially equal to the first number of bytes plus the second number of bytes; after transferring the third number of bytes, transfer the first number of bytes to the data buffer; and iteratively repeat the step of transferring the first number of bytes to the data buffer until all bytes of the read job are transferred to the data buffer; a write data engine coupled to the control circuit and to the data buffer, the write data engine operable to transfer a fourth number of bytes from the data buffer to a destination. The fourth number of bytes may further include an interconnect transaction size number of bytes. The data buffer may be operable to receive a read job status indication from the read data engine and to provide the read job status indication to the write data engine. To transfer a fourth number of bytes may include transferring all bytes from the data buffer to a destination based on the read job status indication that the first read job is complete. To transfer a fourth number of bytes may further include to transfer a fourth number of bytes based on the read job status indication that the first read job is inactive and the data buffer has reached a threshold.

Therefore, by now it can be appreciated that there has been provided, a system and method for operating a DMA unit with address alignment. Because bandwidth may be shared amongst multiple DMA jobs, a bandwidth control setting (BWC) is used to define a number of bytes to transfer before context switching to another job. When a misaligned source address is detected, a read data engine of the DMA transfers a number of bytes to reach alignment plus a BWC number of bytes in the first transfer. In subsequent transfers, the read data engine transfers aligned BWC number of bytes until all bytes of the job are read into a buffer. After a suitable number of bytes of data are read into the buffer, a write engine transfers the data to a destination location through automatically aligned writes. A status is provided from the read data engine to the buffer and from the buffer to the write data engine, allowing for a processing priority based on the status of each job.

By aligning the first read transfer of data to the buffer, subsequent read transfers of BWC size within a job remain aligned. Write transfers to a destination may use an interconnect transaction size rather than the BWC size while maintaining alignment within the job. Aligned transfers are very important to improve system performance and to avoid additional latencies.

As used herein, the term "bus" is used to refer to a plurality of signals or conductors which may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterix (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Some of the above embodiments, as applicable, may be implemented using a variety of different information processing systems. For example, although FIG. 1 and the discussion thereof describe an exemplary data processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Also for example, in one embodiment, the illustrated elements of data processing system 100 are circuitry located on a single integrated circuit or within a same device. Alternatively, data processing system 100 may include any number of separate integrated circuits or separate devices interconnected with each other.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for operating a direct memory access (DMA) system, the method comprising:
   configuring, by a control unit, a bandwidth control setting for a first read job, wherein the configuring includes a determination of a data transfer size corresponding to a first number of bytes representing a subset of a total number of bytes for the first read job;
   determining, by a read data engine, a second number of bytes based on the determined data transfer size, wherein the second number of bytes is to reach a read address alignment;
   in a first data transfer of the first read job, transferring, by the read data engine, a third number of bytes to a data buffer, wherein the third number of bytes is equal to the first number of bytes plus the second number of bytes;
   in subsequent data transfers of the first read job, transferring, by the read data engine, the first number of bytes to the data buffer; and
   after the third number of bytes are transferred to the data buffer, transferring, by the read data engine, a fourth number of bytes from the data buffer to a destination.

2. The method of claim 1, wherein transferring the fourth number of bytes further comprises an interconnect transaction size number of bytes.

3. The method of claim 1, wherein determining the second number of bytes further comprises determining the second number of bytes by using the read data engine.

4. The method of claim 1, further comprising providing a status of the first read job to a write data engine.

5. The method of claim 4, wherein using the write data engine further comprises transferring bytes to the destination based on the status of the first read job.

6. The method of claim 4, wherein providing the status further comprises providing a status indicative that the first read job is inactive and that the data buffer has reached a threshold.

7. The method of claim 4, wherein providing the status further comprises providing a status indicative that the first read job is complete.

8. The method of claim 7, wherein transferring the fourth number of bytes includes transferring all bytes from the data buffer to the destination based on the indication that the first read job is complete.

9. The method of claim 1, wherein transferring the first number of bytes to the data buffer further comprises context switching from the first read job to a second read job after the first number of bytes are transferred to the data buffer.

10. A method for operating a direct memory access (DMA) system, the method comprising:
    configuring, by a control unit, a bandwidth control setting for a first read job, wherein the configuring includes determining a data transfer size corresponding to a first number of bytes representing a subset of a total number of bytes for the first read job;

determining, by a read data engine, a second number of bytes based on the determined data transfer size, wherein the second number of bytes is to reach a read address alignment for the first read job;

using by the read data engine to transfer a third number of bytes to a data buffer, wherein the third number of bytes is equal to the first number of bytes plus the second number of bytes;

after transferring the third number of bytes, using by the read data engine to transfer the first number of bytes to the data buffer;

iteratively repeating the step of using the read data engine to transfer the first number of bytes to the data buffer until all bytes of the first read job are transferred to the data buffer; and using a write data engine to transfer a fourth number of bytes from the data buffer to a destination.

11. The method of claim 10, further comprising providing a status of the first read job to the write data engine.

12. The method of claim 11, further comprising transferring bytes to the destination based on the status of the first read job.

13. The method of claim 11, wherein providing the status of the first read job further comprises providing a status indicative that the first read job is inactive and the data buffer has reached a threshold.

14. The method of claim 11, wherein providing the status further comprises providing a status indicative that the first read job is complete.

15. The method of claim 14, wherein transferring the fourth number of bytes includes transferring all bytes from the data buffer to the destination based on the indication that the first read job is complete.

16. A direct memory access (DMA) system comprising:

a control circuit including a bandwidth control configuration for a first read job, wherein the bandwidth control configuration includes determining a data transfer size corresponding to a first number of bytes representing a subset of a total number of bytes for the first read job;

a read data engine coupled to the control circuit and to a data buffer, the read data engine operable to:

determine a second number of bytes based on the determined data transfer size, wherein the second number of bytes is to reach a read address alignment for the first read job;

transfer a third number of bytes to a data buffer, wherein the third number of bytes is equal to the first number of bytes plus the second number of bytes;

after transferring the third number of bytes, transfer the first number of bytes to the data buffer; and iteratively repeat the step of transferring the first number of bytes to the data buffer until all bytes of the first read job are transferred to the data buffer; and a write data engine coupled to the control circuit and to the data buffer, the write data engine operable to transfer a fourth number of bytes from the data buffer to a destination.

17. The system of claim 16, wherein the fourth number of bytes further comprises an interconnect transaction size number of bytes.

18. The system of claim 16, wherein the data buffer is operable to receive a read job status indication from the read data engine and to provide the read job status indication to the write data engine.

19. The system of claim 18, wherein to transfer the fourth number of bytes includes transferring all bytes from the data buffer to the destination based on the read job status indication that the first read job is complete.

20. The system of claim 18, wherein to transfer the fourth number of bytes further comprises to transfer a fourth number of bytes based on the read job status indication that the first read job is inactive and the data buffer has reached a threshold.

* * * * *